US009798035B2

(12) United States Patent
Fouda et al.

(10) Patent No.: US 9,798,035 B2
(45) Date of Patent: Oct. 24, 2017

(54) TIME-LAPSE TIME-DOMAIN REFLECTOMETRY FOR TUBING AND FORMATION MONITORING

(71) Applicant: Halliburton Energy Services, Inc., Houston, TX (US)

(72) Inventors: Ahmed Elsayed Fouda, Columbus, OH (US); Burkay Donderici, Houston, TX (US); George David Goodman, Phoenixville, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 174 days.

(21) Appl. No.: 14/759,030

(22) PCT Filed: Jan. 11, 2013

(86) PCT No.: PCT/US2013/021139
§ 371 (c)(1),
(2) Date: Jul. 2, 2015

(87) PCT Pub. No.: WO2014/109754
PCT Pub. Date: Jul. 17, 2014

(65) Prior Publication Data
US 2015/0346376 A1 Dec. 3, 2015

(51) Int. Cl.
*G01V 3/00* (2006.01)
*G01V 3/26* (2006.01)
(Continued)

(52) U.S. Cl.
CPC .......... *G01V 3/26* (2013.01); *E21B 47/02224* (2013.01); *E21B 47/0905* (2013.01);
(Continued)

(58) Field of Classification Search
CPC ... G01V 3/18; G01V 3/26; G01V 3/28; G01V 2003/084; G01V 3/08; G01V 3/081;
(Continued)

(56) References Cited

U.S. PATENT DOCUMENTS 5,726,578 A 3/1998 Hook
6,114,857 A 9/2000 Kohl
(Continued)

FOREIGN PATENT DOCUMENTS

GB 2463890 A 3/2010

OTHER PUBLICATIONS

International Preliminary Report on Patentability issued in related PCT Application No. PCT/US2013/021139, dated Jul. 23, 2015 (8 pages).
(Continued)

Primary Examiner — Huy Q Phan
Assistant Examiner — Raul Rios Russo
(74) Attorney, Agent, or Firm — Benjamin Fite; Baker Botts L.L.P.

(57) ABSTRACT

A system and method for monitoring a wellbore are disclosed herein. A pulse generator comprises a plurality of ports, wherein a first one of the plurality of ports is coupled to a first location of interest and a second one of the plurality of ports is coupled to a second location of interest. An electromagnetic pulse is generated at the first port and the second port. A reflected electromagnetic pulse is received at the first port and the second port. In another embodiment, the pulses are received at a separate pulse receiver with a plurality of receiving ports. A data storage device is coupled to the pulse generator or the pulse receiver, and data relating to the reflected magnetic pulse is stored at the data storage device.

19 Claims, 9 Drawing Sheets

(51) Int. Cl.
  *G01V 3/34* (2006.01)
  *G01V 3/20* (2006.01)
  *G01V 3/22* (2006.01)
  *G01V 3/18* (2006.01)
  *E21B 47/022* (2012.01)
  *E21B 47/09* (2012.01)

(52) U.S. Cl.
  CPC .................. *G01V 3/18* (2013.01); *G01V 3/20* (2013.01); *G01V 3/22* (2013.01); *G01V 3/34* (2013.01); *G01V 3/265* (2013.01)

(58) Field of Classification Search
  CPC . G01V 3/083; G01V 3/10; G01V 3/20; G01V 3/22; G01V 3/24; G01V 3/265
  USPC ....... 324/323, 327, 329, 330, 332–334, 338, 324/346, 351
  See application file for complete search history.

(56) References Cited

U.S. PATENT DOCUMENTS

| | | |
|---|---|---|
| 6,275,050 B1 | 8/2001 | Born et al. |
| 7,940,061 B2 | 5/2011 | Focia et al. |
| 2001/0033164 A1 | 10/2001 | Vinegar et al. |
| 2003/0010493 A1 | 1/2003 | Hill et al. |
| 2003/0010495 A1* | 1/2003 | Mendez .................. E21B 47/14 166/255.1 |
| 2005/0274513 A1 | 12/2005 | Schultz et al. |
| 2006/0005965 A1* | 1/2006 | Chouzenoux ....... E21B 47/0006 166/250.11 |
| 2008/0253230 A1* | 10/2008 | Thompson ........... G01V 11/002 367/129 |
| 2010/0223011 A1 | 9/2010 | Parsche |
| 2011/0054808 A1 | 3/2011 | Pearce et al. |
| 2011/0164468 A1* | 7/2011 | Robbins ............... G01V 11/002 367/82 |
| 2011/0185807 A1 | 8/2011 | Albrecht et al. |
| 2011/0290477 A1 | 12/2011 | Jaaskelainen |
| 2012/0084055 A1 | 4/2012 | Smithson |
| 2012/0106297 A1* | 5/2012 | Fraser ................. E21B 41/0085 367/83 |
| 2012/0327742 A1* | 12/2012 | Kusko .................... G01V 1/137 367/25 |

OTHER PUBLICATIONS

International Search Report and Written Opinion issued in related International Application No. PCT/US2013/021139 dated Sep. 24, 2013, 11 pages.

* cited by examiner

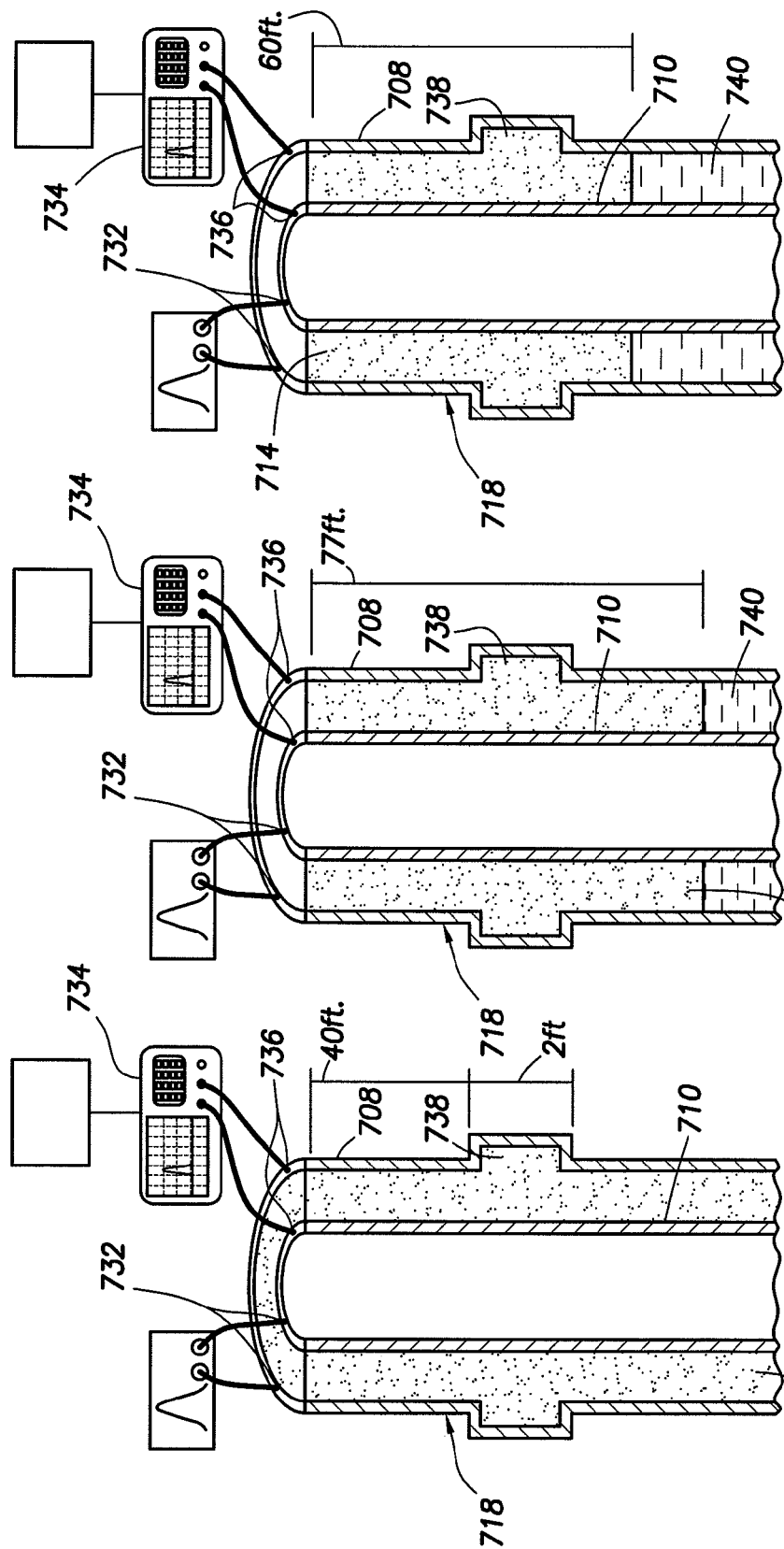

TIME-LAPSE TIME-DOMAIN REFLECTOMETRY FOR TUBING AND FORMATION MONITORING

CROSS-REFERENCE TO RELATED APPLICATION

The present application is a U.S. National Stage Application of International Application No. PCT/US2013/021139 filed Jan. 11, 2013, which is incorporated herein by reference in its entirety for all purposes.

BACKGROUND

As oil well drilling becomes increasingly complex, the importance of collecting and analyzing downhole data while drilling increases. When performing subterranean operations such as drilling or completing wells, it is often desirable to monitor, locate, and image deformations in the well casing and/or the tubing used. It is also desirable to monitor the integrity of the cement layer around the well to detect any problems in the cement or changes in the formation during hydrocarbon production near the well or well flooding. Well logging instruments are often used to probe subsurface formations to determine formation characteristics.

Sonic tools are an example of well logging tools that may be used to provide information regarding subsurface acoustic properties that can be used to analyze the formation. This information may include, for example, compressional wave speed, shear wave speed, wellbore modes, and formation slowness. The information obtained by acoustic measurements has a number of applications, including, but not limited to, seismic correlation, petrophysics, rock mechanics and other applications.

During a typical sonic logging of a formation, an acoustic logging instrument or tool is lowered into a wellbore that transverses a formation of interest. The acoustic logging tool may be mounted to the drill collar or other devices and directed downhole. Conventional acoustic logging tools may include acoustic transducer elements such as a piezoelectric element. Generally, the acoustic transducer can convert electric energy to acoustic energy as well as acoustic energy to electric energy and may act as an acoustic source or an acoustic sensor. The acoustic logging tool may include a transmitter which performs as an acoustic source and emits acoustic energy into the formation and one or more receivers or acoustic sensors that receive acoustic energy. Once the acoustic logging tool is lowered into the formation, the transmitter may be periodically actuated to emit pulses of acoustic energy as acoustic waves into the wellbore. The emitted acoustic waves propagate through the wellbore wall producing a reflection that is then detected by the receiver(s) which produce an electric signal in response. Attributes of the reflected acoustic waves that are detected at the receiver(s) may then be used to characterize subsurface properties of the formation of interest.

However, the receiver(s) of the acoustic logging tool are typically also sensitive to undesired acoustic noise that may result from normal drilling operations. For instance, the undesired acoustic noise may propagate with reduced attenuation through a hard steel drill collar. The acoustic noise may then couple to the receiver of the acoustic logging tool and be converted into electrical noise along with the desired signal. This background noise may be a result of the downhole operations or produced by other acoustic sources and therefore may introduce an error in the measurements by the acoustic logging tool. It is therefore desirable to provide a logging tool that can minimize or eliminate the susceptibility of the logging tool to the background noise.

Additionally, traditional logging tools often involve complex downhole equipment and sensors which may be expensive to operate and maintain. Therefore, there is a need for a simpler, lower-cost method for monitoring wellbore conditions.

BRIEF DESCRIPTION OF THE DRAWING(S)

The present disclosure will be more fully understood by reference to the following detailed description of the preferred embodiments of the present disclosure when read in conjunction with the accompanying drawings, in which like reference numbers refer to like parts throughout the views, wherein:

FIGS. 7A-7C depict illustrative implementations of a system in accordance with an embodiment of the present disclosure.

Figure 1A:
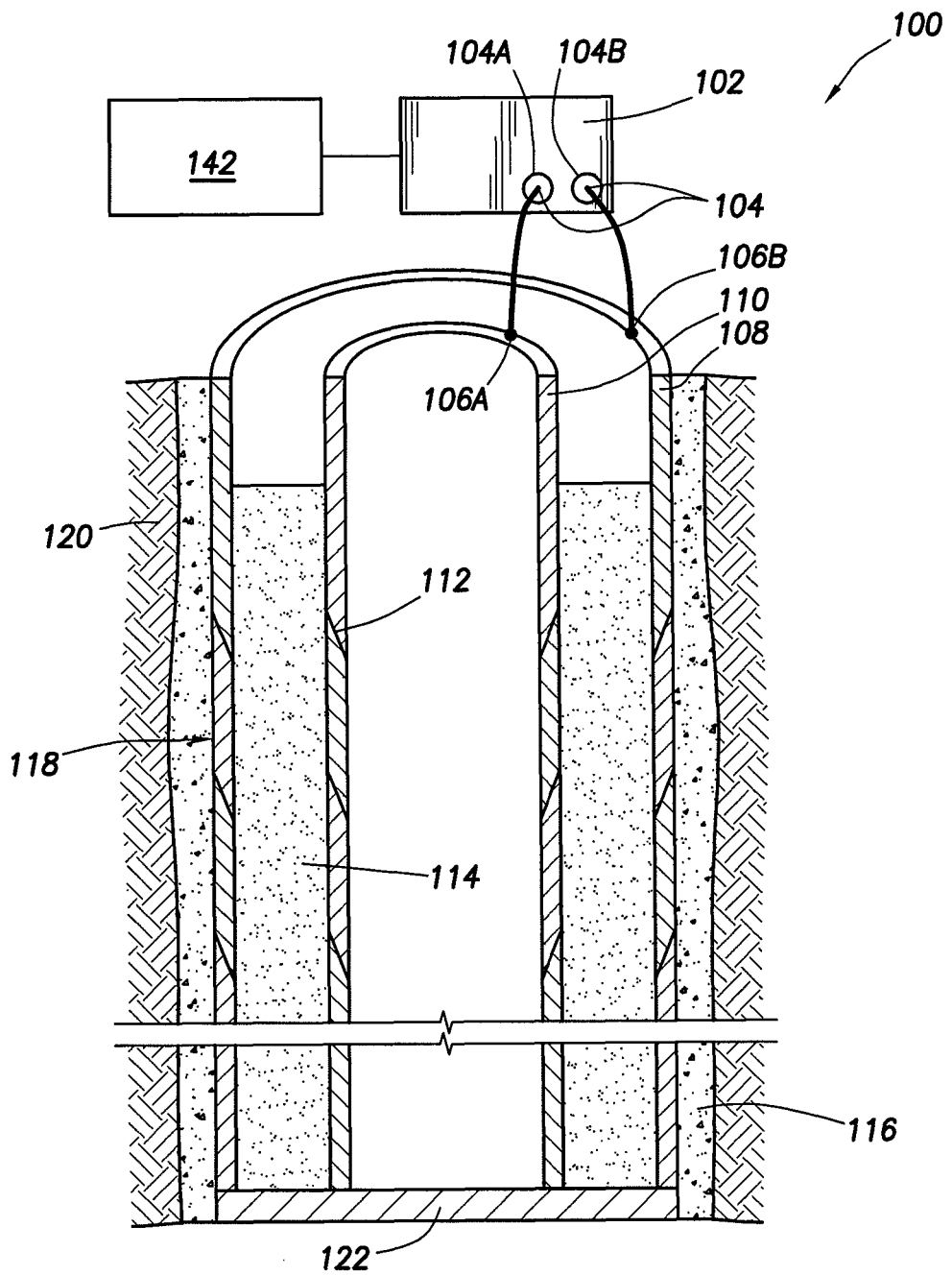
FIG. 1A depicts an arrangement of a system for analyzing a wellbore in a formation in accordance with a first illustrative embodiment of the present disclosure.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION OF THE DISCLOSURE

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; and/or any combination of the foregoing.

The terms "couple" or "couples" as used herein are intended to mean either an indirect or a direct connection. Thus, if a first device couples to a second device, that connection may be through a direct connection, or through an indirect electrical or mechanical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. The term "wellbore" as used herein refers to any hole drilled into a formation for the purpose of exploration or extraction of natural resources such as, for example, hydrocarbons. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons. Embodiments of the present disclosure may be used with any wellhead system. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

The present disclosure generally relates to subterranean operations. More particularly, the present disclosure relates to continuous monitoring of deformations in well casing and/or tubing, fluid distribution inside and around a well, and/or cement layer integrity around a well. Specifically, in certain embodiments, the disclosure utilizes time-lapse time domain reflectometry to achieve the above. In time-lapse time domain reflectometry, a pulse is emitted from a source and reflections that are created due to changes in the propagating medium are recorded. This recording may be conducted more than once. The changes between these successive measurements may then be analyzed. This time-lapse analysis is useful in rejecting static features and amplifying dynamic ones in the data, such as in the case of a moving flood front.

FIG. 1A depicts a cross-sectional view of a system 100 for analyzing a wellbore 118 in a formation 120 in accordance with certain embodiments of the present disclosure. In certain implementations, the wellbore 118 may be cased with a casing 108. However, as would be appreciated by those of ordinary skill in the art, the use of a casing 108 is depicted for illustrative purposes and a system without a casing 108 may be used without departing from the scope of the present disclosure. The system 100 may further include a tubing 110 that has been disposed or fitted within the wellbore 118. In the illustrative embodiment of FIG. 1A where the wellbore 108 is cased, the tubing 110 is disposed within the casing 108. In some embodiments, cement 116 may be disposed between the casing 108 and a wall of the wellbore 118. The casing 108 and tubing 110 may be substantially conductive concentric tubes disposed or positioned within the wellbore 118 such that the tubing 110 extends concentrically within the casing 108. A pulse generator 102 may have two or more ports 104A, 104B that may be coupled to the casing 108 and the tubing 110 at two contacts 106A, 106B in accordance with an embodiment of the present disclosure. The pulse generator 102 generates a voltage that induces transient electromagnetic (EM) pulses to the contacts 106A, 106B. One of the ports 104A may be coupled to a first contact 106A at a first location of interest and a second port 104B may be coupled to a second contact 106B at a second location of interest.

In the embodiment shown in FIG. 1A, one contact 106A is coupled to tubing 110 and the other contact 106B is coupled to casing 108, either at an open or closed section of the tubing 110 or casing 108. A closed section of the tubing 110 or casing 108 may include a plugged section of tubing 110 or a capped section of casing 108. The tubing 110 and casing 108 may be used as waveguides to guide the EM pulses generated by the pulse generator 102 downhole. In the embodiment shown in FIG. 1A, ports 104 are used both for transmitting EM pulses and also receiving reflections of the transmitted EM pulses. However, some embodiments may use a separate receiver for reception of reflected pulses (see, e.g. FIG. 6 and associated description). When the pulse generator 102 or separate receiver receives the reflected pulses, it acquires voltage that results from the pulses. In the illustrative embodiment of FIG. 1A, the pulse generator 102 is located at the surface of the wellbore 118. However, the pulse generator 102 may be located at least partially or completely inside the wellbore 118 (i.e., the pulse generator 102 may be located permanently downhole) without departing from the scope of the present disclosure.

When performing drilling operations, a filling material 114 may be directed downhole. The filling material 114 may perform a number of functions, including, but not limited to, lubricating the drill bit and/or removing cuttings to the surface. Filling material 114 may fill the space in between casing 108 and tubing 110. The filling material 114 may be a mud, for example, but is not intended to be limited to such.

During operation of the system 100, EM pulses are generated by the pulse generator 102 and may be directed to the contacts 106A, 106B through the ports 104A, 104B, respectively. As shown in FIG. 1A, in one illustrative embodiment, the contacts 106A, 106B may be located at the same or substantially same axial location along the wellbore 118. Location of contacts 106A, 106B at the same or substantially same axial location helps minimize excitation of unwanted modes because the mathematical models correspond with the contacts 106A, 106B being located at the same or substantially same axial location. The term "substantially same axial location" refers to placement of the first contact 106A and the second contact 106B within a distance that is comparable to the radial distance between the inner and outer tubes. When the contacts 106A, 106B are separated, additional circuit elements may come into play that may complicate the reception of the pulses because EM propagation may appear between the contacts 106A and 106B. Unwanted modes may be any mode other than the intended mode of operation such as TE (transverse-electrical) modes, TM (transverse-magnetic) modes, or any other 3D waveguide mode that is not predicted or controlled and that will reduce the accuracy of the measurement. However, as long as these unwanted modes are small enough, the contacts 106A, 106B do not have to be located at the same azimuth or axial location. In certain embodiments, EM pulses having a frequency in the range of approximately 1 Hz to approximately 10 GHz may be used. High frequencies may be used for high resolution but produce low range. The pulse generator 102 receives reflected pulses in the form of EM signals at the ports 104 and stores the measured data at a data storage device 142. The data storage device 142 may be a computer-readable medium. The data storage device 142 and pulse generator 102 may be communicatively coupled. The data storage device 142 may be placed downhole, uphole, or at a remote location. These steps may be repeated in order to perform a time-lapse analysis, where the direct signal is cancelled out and reflected signals corresponding to deformations in the structure (i.e., wellbore and/or casing) within a time interval remain.

For example, after an EM pulse is generated from the generator 102, a first reflected EM pulse may be received at the ports 104A, 104B at a first point in time. A second reflected EM pulse may be received at the ports 104A, 104B at a second point in time. The time at which the second reflected EM pulse was received at the ports 104A, 104B may be subtracted from the time at which the first reflected EM pulse was received at the ports 104A, 104B to obtain a time-lapse. Said differently, the "time-lapse" is equivalent to the difference between the second point in time and the first point in time mentioned above. In certain embodiments, the time-lapses may be plotted as a function of time. In certain embodiments, the time-lapses may be inverted to obtain a distribution of the shape of the casing 108. Moreover, in certain embodiments, the time-lapses may be inverted or otherwise mathematically operated on to obtain a distribution of EM properties of a fluid in the wellbore 118. In cases where phase shifts are small enough (frequencies are low enough) or dispersion is low enough, reflection delays can be related to deformation depths in the wellbore 118 by estimating the propagation velocity from previous knowledge of the wellbore 118 parameters. Likewise, reflection amplitudes may be scaled by the estimated signal attenuation at the corresponding deformation depth to get the relative strengths of different deformations. In certain implementations, reflection polarity may be used to estimate the shape of deformations. For example, an increase in the ratio of the diameters of the casing 108 and tubing 110 at any section may be associated with a positive reflection and a decrease in the ratio of diameters of the casing 108 and the tubing 110 may be associated with a negative reflection. Finally, uprising flooding can be discriminated from deformations in the casing 108 and tubing 110 by observing the evolution of the reflections over a time interval. Reflections associated with flooding evolve at a faster pace than those associated with deformations in casing 108 or tubing 110. Association of depth and signal reception time, phase, and amplitude can be performed by a calibration procedure where known scatterers or separate sources at known depths are used.

The casing 108, tubing 110, and filling material 114 act as a cross-section lossy coaxial cable structure. A cross-section lossy coaxial cable structure is a transmission medium in electromagnetics that is well known to one of ordinary skill in the art having the benefit of this disclosure. A coaxial cable is used in homes, for example, in cables that carry high frequency signals, as a replacement for twisted cable configurations. A differential segment of a lossy coaxial cable can be modeled by the equivalent circuit model shown in FIG. 1B. The model elements may be calculated using the following equations:

$$L = \frac{\mu}{2\pi} \ln\frac{b}{a} \left(\frac{H}{m}\right)$$

$$C = \frac{2\pi\varepsilon}{\ln\frac{b}{a}} \left(\frac{F}{m}\right)$$

$$R = \frac{R_s}{2\pi}\left(\frac{1}{a} + \frac{1}{b}\right)\left(\frac{\Omega}{m}\right)$$

$$G = \frac{2\pi\sigma_m}{\ln\frac{b}{a}} \left(\frac{s}{m}\right)$$

where a and b are the radii of the inner and outer conductors, respectively;
$R_s$ is the conductor surface resistance given by $$R_s = \sqrt{\frac{\omega\mu}{2\sigma_c}};$$

Figure 1B:
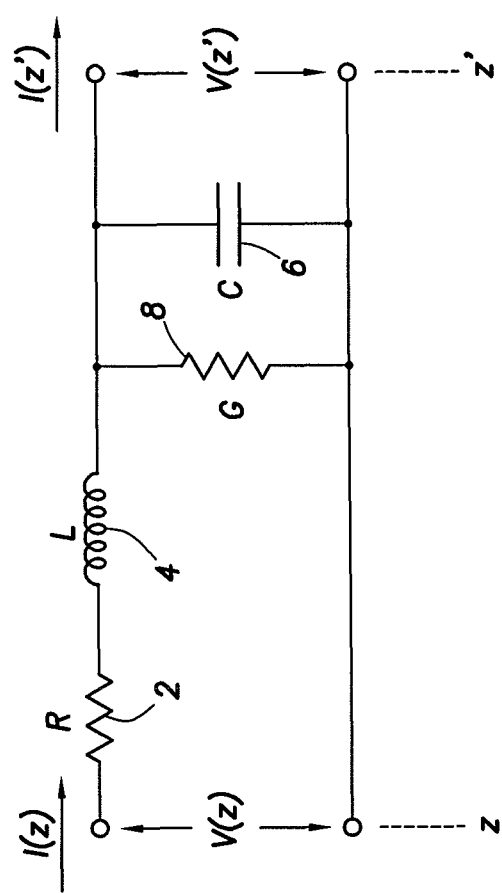
FIG. 1B depicts a circuit model of a differential segment of a lossy coaxial cable in accordance with certain illustrative embodiments of the present disclosure.

L is the inductance of a inductor 4 shown in FIG. 1B;
C is the capacitance of a capacitor 6 shown in FIG. 1B;
R is the resistance of a resistor 2 shown in FIG. 1B;
G is the conductance of a second resistor 8 shown in FIG. 1B; and
s (siemens), m (meters), F (Frads), and H (Henrys) are units indicating the dimensions of calculated results.

Applied voltage excites the fundamental mode of this structure which is the quasi-TEM (quasi-transverse electric) mode. TEM mode is a two-dimensional EM propagation mode where only two electric field components and one magnetic field component are active. This mode can be modeled using the transmission line (TL) theory. The TL theory is well known to those of ordinary skill in the art having the benefit of this disclosure and will therefore not be discussed in detail herein. The characteristic impedance and the propagation constant of the TL may be determined by the following equations:

$$Z_0 = \sqrt{\frac{R + j\omega L}{G + j\omega C}}$$

$$v = \sqrt{(R + j\omega L)(G + j\omega C)}$$

where Zo is the transmission line's characteristic impedance, and v is the propogation constant.

The characteristic impedance and the propagation constant of the TL may depend on the geometry and conductivity of an inner conductor and an outer conductor, and the dielectric constant and conductivity of the filling material 114. In the illustrative embodiment shown in FIG. 1, the inner conductor and outer conductor are the tubing 110 and casing 108, respectively. Any deformations in the geometry of the casing 108 or tubing 110, or any change in the electrical properties of the filling material 114 at a certain depth inside the wellbore 118, will change the propagation characteristics at that depth. This will cause reflections that can be measured. In certain embodiments, these reflections may be measured at the pulse generator 102.

The transmission line model shown in FIG. 1B is an unbalanced one, where a resistor (R) and an inductor (L) are located only on the top side of the circuit. It should be noted that models with alternative equivalent circuits could be used with the same or similar results without departing from the scope of this disclosure. For example, half of the resistance and half of the inductance on the top could be moved to the wire shown at the bottom of the Figure, which would balance the circuit between the top and the bottom sides. This would not change the impedance as seen from the left-hand side or right-hand side of FIG. 1B.

If the pulse generator 102 is connected to a closed section of the casing 108 or tubing 110, a measured signal will encompass reflections due to deformations on both sides of a first contact 106A or second contact 106B, which may make it difficult to locate where a deformation exists. To avoid bidirectional propagation of the applied pulses, non-conductive segments (not shown) of the casing 108 may be inserted to provide separation between the different conducting zones.

A time-domain data acquisition device with low noise floor and sufficiently large dynamic range can be used to measure the total voltage between the casing 108 and tubing 110 by applying and receiving pulses at the casing 108 and tubing 110. In certain embodiments, the time-domain data acquisition device may be an oscilloscope. The time-domain data acquisition device may measure both applied and reflected voltages resulting from the applied and reflected EM pulses.

Reflectometry can also be used in conjunction with a through casing application. In this application, a very low frequency pulse is used for penetration of the casing 108 and reflected voltages are received as a function of time at a single location (as opposed to logging in standard through casing application). As a result, the signal on the casing 108 or tubing 110 is highly dispersed and has a very low resolution. Measurements A, B, and C may be taken at three receivers located at different points along the casing 108 or tubing 110. A first difference A-B may be calculated. A second difference (A-B)-(B-C)=A-2B-C, may also be calculated. The second difference can be used in conjunction with the first difference to obtain high resolution estimates of resistivity values outside the casing 108. A second transmitter may be needed to reduce the effects of unknown pipe resistance.

As the EM pulses travel downhole, they may lose strength. However, the rate at which the pulses lose strength may depend on a number of factors including, but not limited to, the properties of the filling material 114. Detection depth and the sensitivity of measurements to structure deformations may be governed by one or more of the following factors: (i) the maximum power that can be delivered by the pulse generator 102 at or proximate to the surface; (ii) the noise floor of the data acquisition system that determines the minimum detectable signal (the signal-to-noise ratio may be enhanced by averaging multiple acquisitions); (iii) the dynamic range of the data acquisition system (this dynamic range limitation can be mitigated by using a coaxial directional coupler or a transmitter/receiver switch to connect the pulse generator 102 and data acquisition system, and therefore avoid measuring direct signal); (iv) the conductivity of the filling material 114, where higher filling material conductivities lead to faster attenuation and smaller depth of detection; and (v) transient pulse spectrum: lower frequencies suffer less attenuation and hence can be used for deep detection (this comes at the expense of spatial resolution).

Note that the EM signals may be received at the same ports 104A, 104B from which they were generated, as shown in FIG. 1A, or there may be additional ports for the purpose of separately receiving pulses. In such an embodiment, the receiver and transmitter may be separate units, or the pulse generator 102 may include more ports (not shown) to accommodate both receiving and transmitting.

Figure 2:
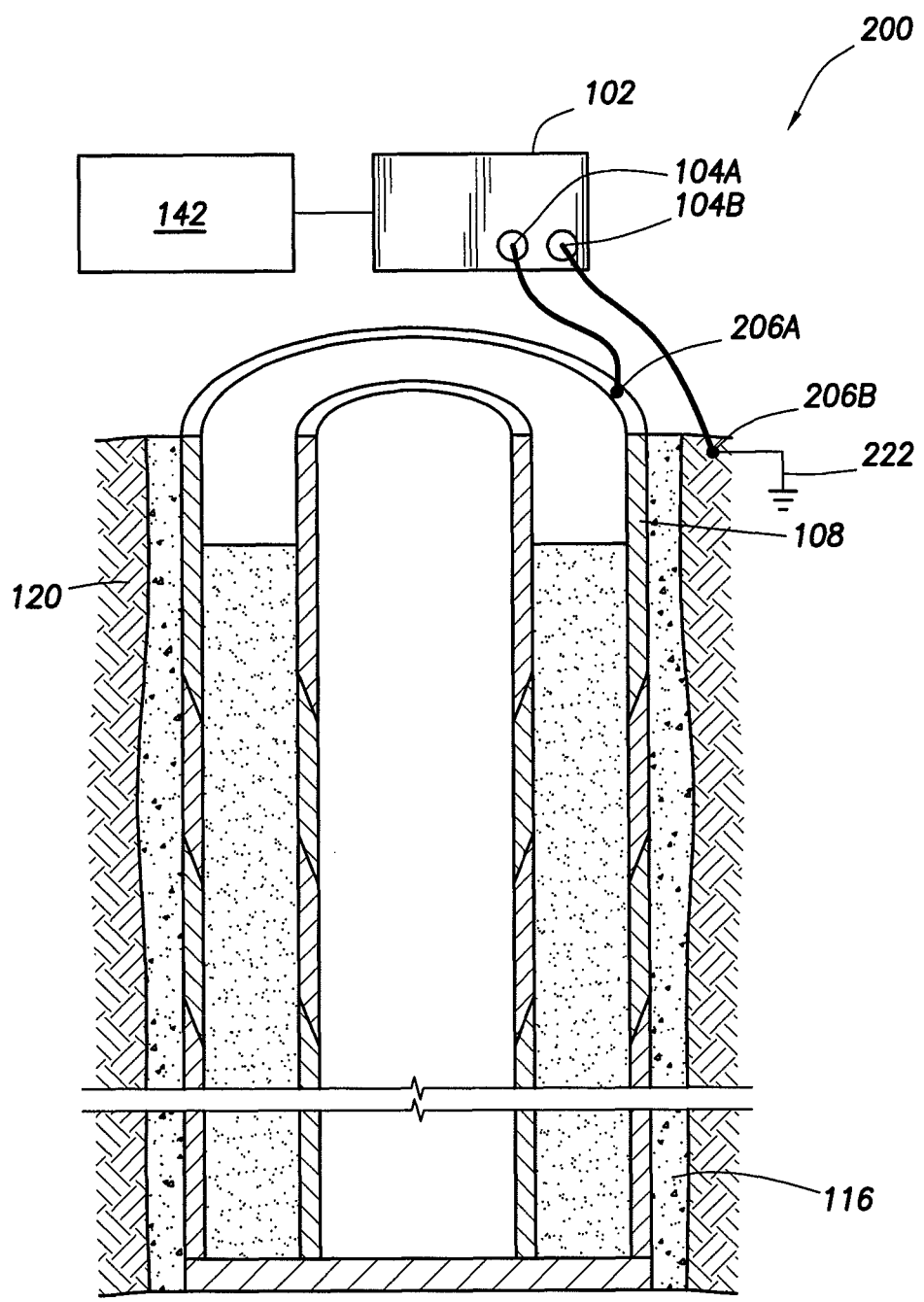
FIG. 2 depicts an arrangement of a system in accordance with a second illustrative embodiment of the present disclosure.

In the embodiment of FIG. 2, a system 200 includes the pulse generator 102 having a first port 104A coupled to a contact 206A at the casing 108 and a second port 104B coupled to a contact 206B at a ground terminal 222. The ground terminal 222 may be located outside the casing 108, e.g., in the formation 120, at an electrically distant location. The term "electrically distant location" as used herein refers to the EM propagation length of the wire connecting the second port 104B to the contact 206B at the ground terminal 222 relative to a resolution of a time measurement of a reflection of an EM pulse. It may also refer to the ground wire's parasitic electrical elements relative to the transmission line being measured. This measurement can be made independent of if or how the ground terminal 222 connection is made.

During operation of the system 200, the casing 108 acts as the inner conductor, and the formation 120 as the outer conductor for electromagnetic pulses generated at the ports 104A, 104B of the pulse generator 102. In this case, reflections may result from any deformations in the outer wall of the casing 108 (such as corrosions or breaks), deformations in the cement layer 116, and/or any change in the electrical properties of the formation 120 (such as a change in fluid distribution). For example, an electromagnetic pulse may be reflected off a crack or deformity in the formation 120 and sent back to the pulse generator 102. The pulse generator 102 receives reflected pulses in the form of EM signals at the ports 104A, 104B and stores the measured data at the data storage device 142. The data storage device 142 and pulse generator 102 may be communicatively coupled. The data storage device 142 may be placed downhole, uphole, or at a remote location.

Figure 3:
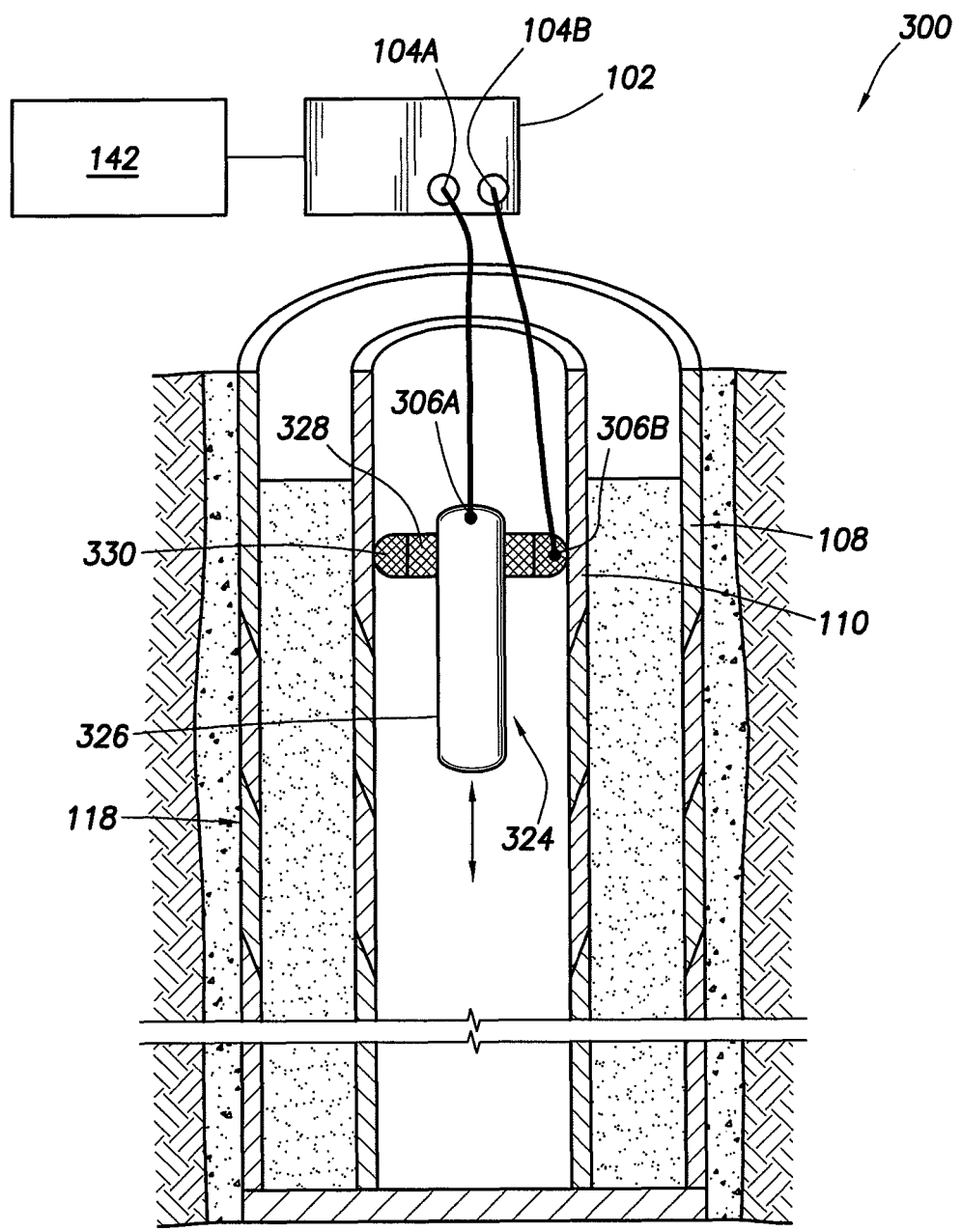
FIG. 3 depicts an arrangement of a system for analyzing a wellbore in a formation in accordance with a third illustrative embodiment of the present disclosure.

FIG. 3 depicts a cross-sectional view of a system 300 for analyzing the tubing 110 in accordance with certain embodiments of the present disclosure. Like the embodiments in FIGS. 1 and 2, the casing 108 and the tubing 110 have been disposed in the wellbore 118. Similarly, the pulse generator 102 includes a first port 104A and a second port 104B. However in this embodiment, the first port 104A is coupled to a first contact 306A at a tool body 326 of a logging tool 324 that can travel downhole, and a second port 104B is coupled to a second contact 306B at an inner wall of the tubing 310. In certain implementations, the logging tool 324 may include one or more electrodes 330 to facilitate coupling a selected portion of the inner wall of the tubing 310 to the second contact 306B. The electrodes 330 may establish electrical contact between the second contact 306B and the tubing 310. An insulator 328 may be used to insulate the electrodes 330 from the tool body 326, which is used as the return. The insulator 328 is a non-conductive material. Any suitable non-conductive material may be used as the insulator 328. In certain embodiments, the insulator 328 may be formed of viton rubber. As in previous embodiments, the data storage device 142 and pulse generator 102 may be communicatively coupled. As in previous embodiments, the data storage device 142 may be placed downhole, uphole, or at a remote location. This arrangement allows the contacts 306A, 306B to be closer to an area of interest. Because the pulses may be transmitted and received closer to the area of interest, the received signal levels may be increased and the dispersion effects observed in the received signal may be decreased.

In operation of the system 300, EM pulses are applied between the inner wall of the tubing 110 and the tool body 326 to monitor the tubing 110. In at least one embodiment, the logging tool 324 can be moved up and down by an operator to monitor different sections of the tubing 110. The pulse generator 102 receives reflected EM pulses at the ports 104A, 104B and stores the measured data at the data storage device 142. The tubing 110, tool body 326, and material inside the tubing 110 act as a cross-section lossy coaxial cable structure, which is a transmission medium in electromagnetics analogous to that in the system 100.

Figure 4:
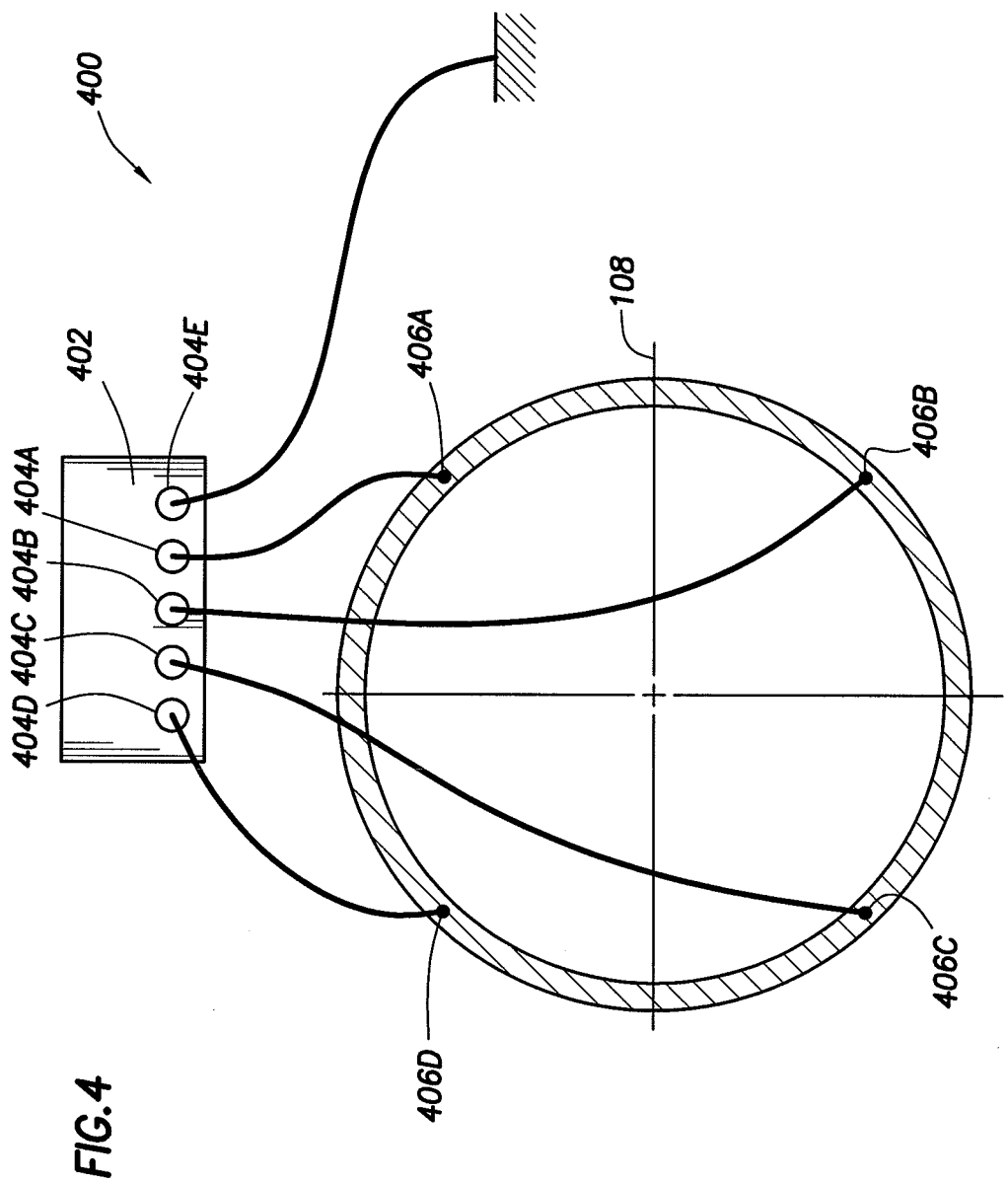
FIG. 4 depicts an arrangement of a system with ports distributed around the perimeter of the casing in accordance with certain illustrative embodiments of the present disclosure.

FIG. 4 depicts a cross-sectional view of a system 400 for analyzing a casing 108 at various azimuthal locations in accordance with certain embodiments of the present disclosure. The system 400 includes a pulse generator 402 with multiple ports 404 connected at multiple contacts 406 located at different azimuthal locations around the perimeter of the casing 108. The number of ports 404 and contacts 406 can vary as desired without departing from the scope of the present disclosure. For instance, in certain embodiments, the numbers of ports 404 and contacts 406 can be two, three, four, or any other desired number.

The system 400 shown in the illustrative embodiment of FIG. 4 may be used to estimate the azimuthal location of a deformation. Because contacts 406 are located at multiple locations around the perimeter of the casing 108, they may help acquire the spatially diverse information that is required to sense azimuthal variations around the casing 108. The spatially diverse information may be obtained by taking measurements from pairs of contacts 406, where a first electromagnetic pulse is generated at a first port 404A of the pulse generator 402 to a first contact 406A, a reflection of the first electromagnetic pulse is received at a third contact 406C and transmitted to a third port 404C of the pulse generator 402, and wherein a second electromagnetic pulse is generated at a second port 404B of the pulse generator to a second contact 406B and a reflection of the second electromagnetic pulse is received at a fourth contact 406D and transmitted to a fourth port 404D of the pulse generator. This may be repeated for different pairs of contacts 406. In general, it is possible to take N×N unique measurements, where N is the number of contacts 406 in the system 400. A simple TL model does not apply to this embodiment, and a full-wave analysis must be used. The utilization of a full-wave analysis is well known to those of ordinary skill in the art, having the benefit of the present disclosure and will therefore not be discussed in detail herein. Using this information, a user may pinpoint the azimuthal location of a deformation in a wellbore.

Figure 5:
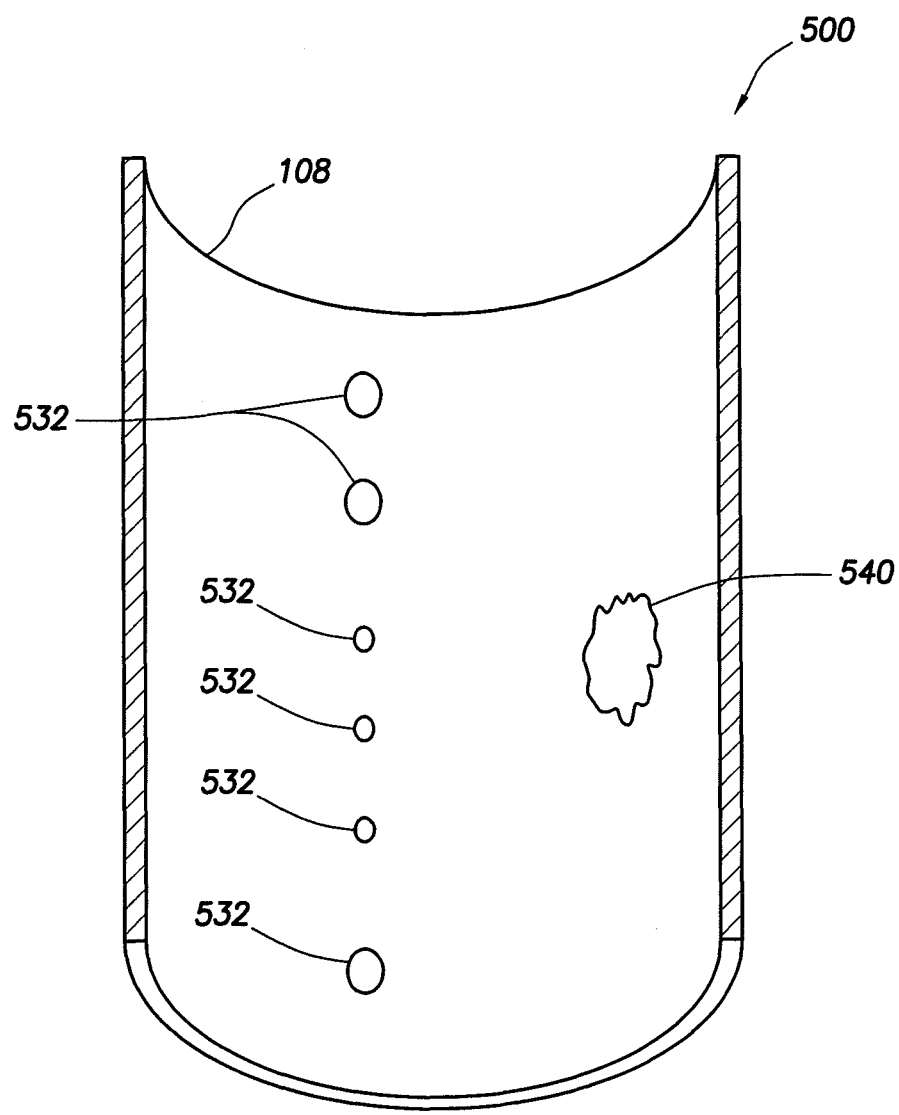
FIG. 5 depicts an arrangement of a system with ports distributed along the casing in accordance with certain illustrative embodiments of the present disclosure.

FIG. 5 depicts another illustrative embodiment of a system 500 in accordance with the present disclosure. In accordance with the embodiment of FIG. 5, ports (not shown) may be placed at a plurality of contacts 532 (e.g., six contacts 532 as shown in FIG. 5) distributed at various axial locations on the casing 108. In accordance with this embodiment, a first contact 532 may be located at a first axial location along the casing 108 and a second contact may be positioned at a second axial location along the casing 108. The number of contacts 532 and the distance between them can vary as desired without departing from the scope of the present disclosure. For instance, in certain embodiments, the number of contacts 532 can be two, three, four, five, seven, eight, or any other desired number. The contacts 532 can be permanently connected to the wall of the casing 108 or placed in contact with the inner wall of a tubing using a wireline logging tool body or sonde lowered inside the tubing as discussed in previous embodiments. A fault 540 may then be detected using the reflectometry method described herein. Each contact 532 may be used to either transmit an EM pulse, receive an EM pulse, or both. This embodiment may generate more spatially diverse information in the axial direction when compared to the embodiment shown in FIG. 4, due to the axial arrangement of the contacts 532. A pulse generator (not shown) may be moved up or down in the wellbore to image different parts of the casing 108 or tubing (not shown), in accordance with the embodiment shown in FIG. 3. The pulse generator (not shown) may also be placed permanently in the vicinity of an area of interest.

Figure 6:
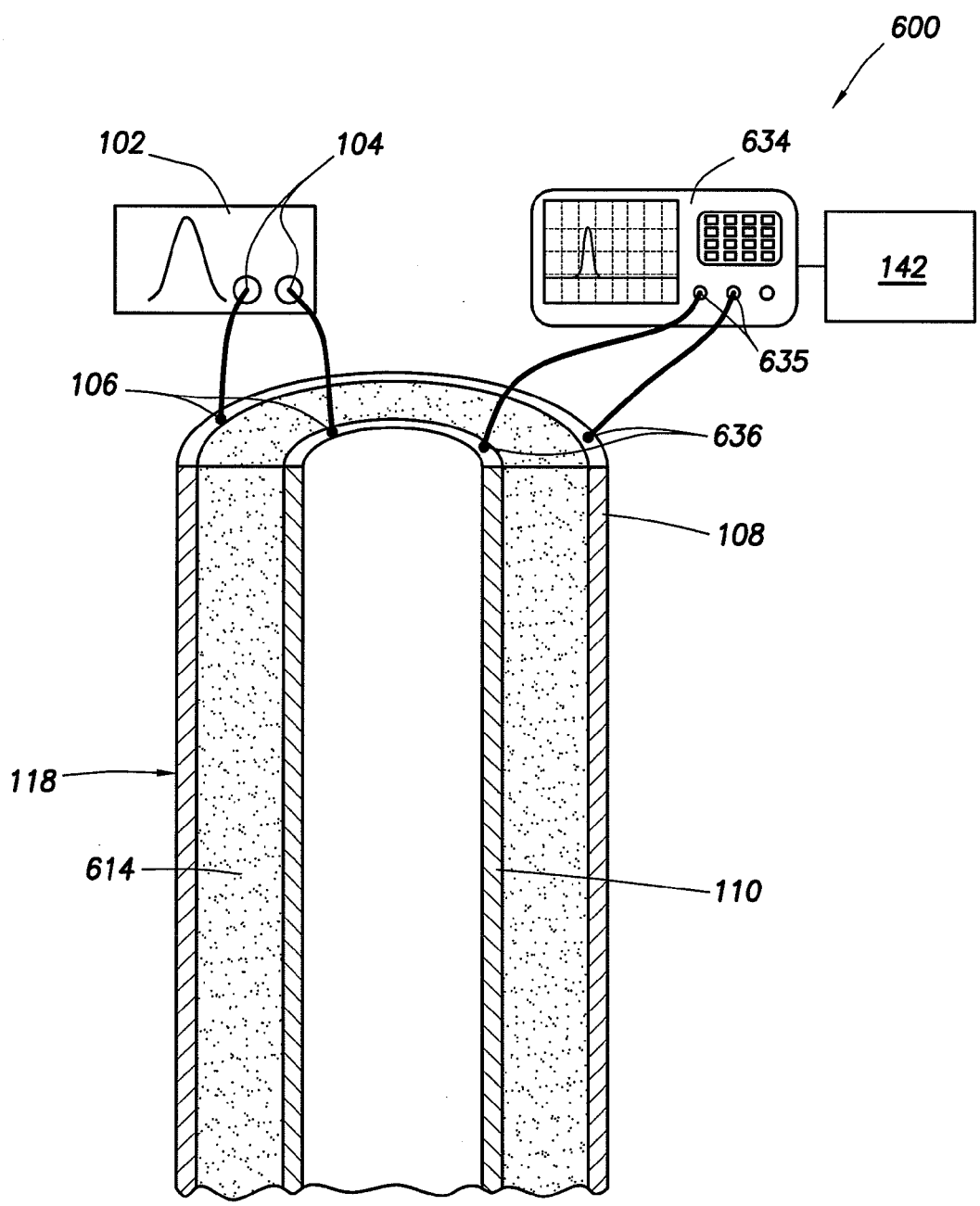
FIG. 6 depicts an arrangement of a system for analyzing a wellbore in a formation in accordance with certain illustrative embodiments of the present disclosure.

FIG. 6 depicts a cross-sectional view of a wellbore 118 that has been drilled with casing 108 and tubing 110 in accordance with an illustrative embodiment of the present disclosure denoted generally with reference numeral 600. The pulse generator 102 has two ports 104 coupled to the casing 108 and tubing 110 at two contacts 106. A separate receiving device 634 has two receiving ports 635, each coupled to the casing 108 and tubing 110 at a corresponding receiving contact 636. The receiving device 634 may be any suitable device such as, for example, an oscilloscope or a time-domain oscilloscope. A data storage device 142 and the receiving device 634 may be communicatively coupled. As in previous embodiments, the data storage device 142 may be placed downhole, uphole, or at a remote location. FIG. 6 shows casing 108 and tubing 110 without any deformations. In FIG. 6, the pulse generator 102 and receiving device 634 are located at the surface of the wellbore 118. However, consistent with the present disclosure, the pulse generator 102 and/or receiving device 634 may be located at least partially or completely inside the wellbore 118 (i.e., the pulse generator 102 and receiving device 634 may be located permanently downhole).

In operation of the system 600, transient pulses are applied by the pulse generator 102 connected at the casing 108 and tubing 110, and total voltage is measured at the receiving device 634. Since the receiving contacts 636 are located at different positions than the transmitting contacts 106, they have relatively less direct or near field effects when compared to far field modes. As a result, the receiving device 634 may help reduce ringing effects in conductive formations.

In certain implementations, the method and system disclosed herein may be implemented using an information handling system. Specifically, the information handling system may include computer-readable media with machine-readable instructions to performs the analysis disclosed in the present disclosure. Moreover, the information handling system may provide a user interface to view and/or analyze the information as it is processed in accordance with the method and system disclosed herein.

EXAMPLE

A method and system in accordance with the illustrative embodiment of FIG. 6 may be used to demonstrate analysis of a wellbore deformation and wellbore flooding that may occur when performing subterranean operations.

First, FIG. 7(*a*) depicts implementation of the illustrative embodiment of FIG. 6 to analyze a wellbore 718 with a deformation 738 in the casing 708. In the illustrative embodiment of FIG. 7(*a*), a casing deformation 738 occurs at a depth of 40 feet from the contacts 732 and extends for 2 feet. In FIGS. 7(*b*) and 7(*c*), the illustrative embodiment of FIG. 6 is used to analyze flooding in a wellbore 718 with an uprising flood 740 that moves up from being approximately 77 ft. from the surface (FIG. 7(*b*)) to being approximately 60 ft. from the surface (FIG. 7(*c*)). In this example, the embodiment described in FIG. 6 is used.

Figure 8A:
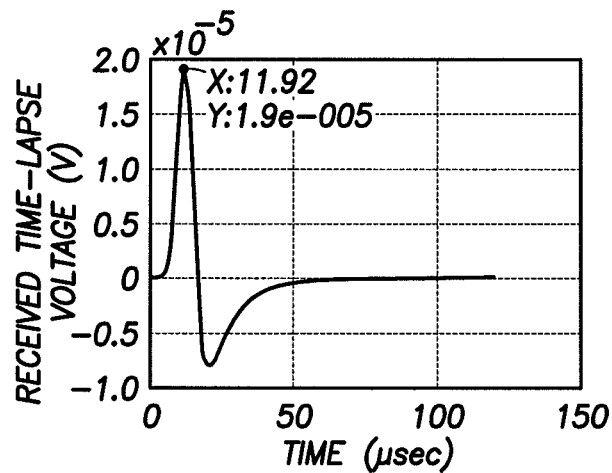
FIG. 8A-8C depict time-lapse time-domain measurements corresponding to the illustrative implementations of FIGS. 7A-7C.
Figure 8B:
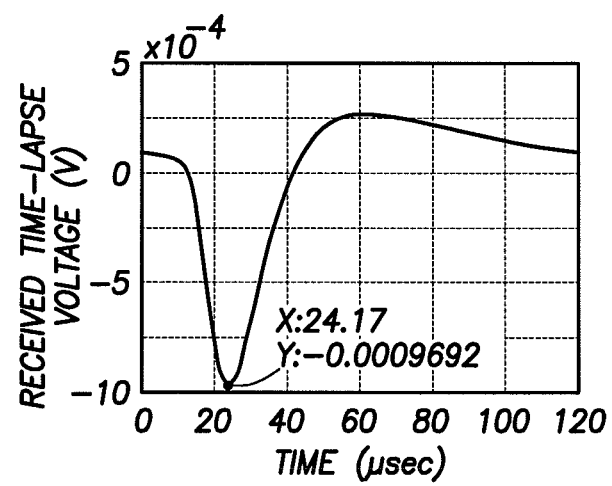
Figure 8C:
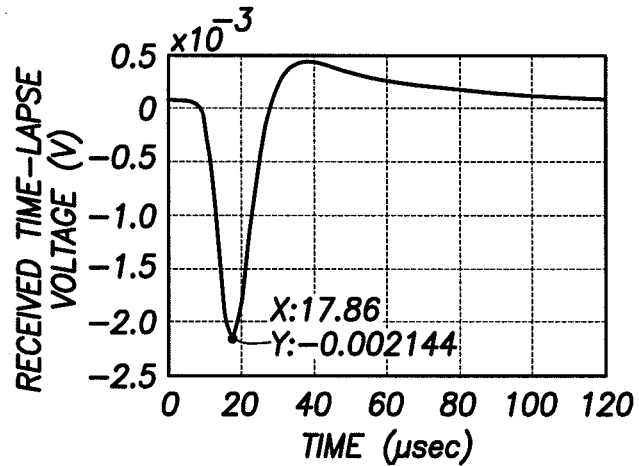

Casing deformations 738 and flooding 740 in the wellbore 718 can be modeled as a step change in the tubing radius as shown in FIG. 8. The casing deformation 738 shown in FIG. 7(*a*) and the flood 740 shown in FIGS. 7(*b*) and 7(*c*) is modeled in FIGS. 8(*a*), 8(*b*) and 8(*c*), respectively. In the examples shown in FIGS. 7(*a*)-(*c*) and modeled in FIG. 8(*a*)-(*c*), both casing 708 and tubing 710 are assumed to be made of carbon steel with conductivity $\sigma_c = 6.99 \times 10^6 \sigma_c = 6.99 \times 10^6$ S/m. In this example, tubing 710 is assumed to have a diameter of 4 inches, casing 708 is assumed to have a diameter of 10 inches, and filling material 714 is assumed to have conductivity $\sigma_m = 0.1$ $\sigma_m = 0.1$ S/m. In this example, the deformed section diameter is assumed to be 10.1 inches, corresponding to a 1% deformation. In this example, flood 740 is assumed to have conductivity of 1 S/m.

Received time-lapse voltage over time may be calculated via modeling as shown in FIGS. 8(*a*)-(*c*). By comparing FIGS. 8(*a*) and 8(*b*), a user may detect that the rising flood 740 created a very large effect on a received voltage. Further, a comparison of FIG. 8(*a*) with FIG. 8(*b*) or 8(*c*) shows that the received voltage from the flood 740 is larger than the received voltage from the casing deformity 738. By comparing FIGS. 8(*b*) and 8(*c*), a user may detect that a flood 740 that is closer to one or more contacts 736 of a pulse receiver 734 creates an earlier received voltage signature. As a result, it is possible to numerically interpret the level of the flood 740 from the received voltage signal. It should be noted that due to time-dispersive effects, the effects from both the deformation 738 and flood 740 are mixed in time. They may be best interpreted by an inversion algorithm that minimizes the difference between the received voltages and voltages from a modeling algorithm. An example of such a modeling algorithm is the circuit model described above in FIG. 1B. The model used is based on the transmission line (TL) model. This example shows that the rising contrast fluid flood 740 may be clearly identified from changes in the received signal.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A system for analyzing properties of and locating defects in a wellbore in a formation, comprising:
    a casing positioned within the wellbore;
    a tubing positioned within the casing, wherein the tubing extends concentrically within the casing;
    a pulse generator having a plurality of ports that generate one or more electromagnetic pulses and receive one or more reflected electromagnetic pulses,
        wherein a first one of the plurality of ports is coupled to a first contact at a first location of interest and a second one of the plurality of ports is coupled to a second contact at a second location of interest, and
        wherein the first location of interest and the second location of interest are selected from a group consisting of a first axial location along the casing and a second axial location along the casing, a first position and a second position along a perimeter of the casing, the casing and a ground terminal, the tubing and a body of a logging tool, and a body of a logging tool and an electrode on a logging tool, respectively, and
    a data storage device coupled to the pulse generator, wherein the data storage device stores data relating to the one or more reflected magnetic pulses.

2. The system of claim 1, wherein the pulse generator is located at a surface of the formation.

3. The system of claim 1, wherein the pulse generator is located at least partially inside the wellbore.

4. The system of claim 1, wherein the first contact and the second contact are located at substantially the same axial location.

5. The system of claim 1, wherein the ground terminal is located outside of the casing.

6. The system of claim 1, wherein the logging tool is movable between a first axial position along the wellbore and a second axial position along the wellbore.

7. A system for analyzing a wellbore in a formation, comprising:
- a casing positioned within the wellbore;
- a tubing positioned within the casing, wherein the tubing extends concentrically within the casing;
- a pulse generator, having a plurality of generating ports, wherein an electromagnetic pulse is generated at the generating ports;
  - wherein a first one of the plurality of generating ports is coupled to a first location of interest and a second one of the plurality of generating ports is coupled to a second location of interest,
  - wherein the first location of interest and the second location of interest are selected from a group consisting of the casing and a ground terminal, the tubing and a body of a logging tool, and a body of a logging tool and electrodes on a logging tool, respectively,
- a pulse receiver, having a plurality of receiving ports, wherein a reflection of the electromagnetic pulse is received at the receiving ports; and
- a data storage device, wherein data relating to the reflection of the electromagnetic pulse is stored at the data storage device.

8. The system of claim 7, wherein a first one of the receiving ports and a second one of the receiving ports are positioned at a location selected from a group consisting of the casing and the tubing, the casing and a ground terminal, the tubing and a body of a logging tool, and a body of a logging tool and electrodes on a logging tool, respectively.

9. The system of claim 7, wherein the logging tool is movable along the wellbore.

10. The system of claim 7, wherein the pulse receiver is an oscilloscope.

11. The system of claim 7, wherein the pulse generator and pulse receiver are located at a surface of the wellbore.

12. The system of claim 7, wherein the pulse generator and pulse receiver are located inside the wellbore.

13. A method of monitoring a wellbore, comprising:
- generating a first electromagnetic pulse and a second electromagnetic pulse at a pulse generator,
  - wherein the first electromagnetic pulse and the second electromagnetic pulse are directed to a location of interest;
  - wherein the location of interest is selected from a group consisting of: a deformation in a casing, a deformation in a tubing, a change in thickness of the casing, a change in thickness of the tubing, a change in an electromagnetic property of a fluid in an annulus between the casing and the tubing, and a change in an electromagnetic property in a formation outside the casing;
- receiving a reflection of the first electromagnetic pulse at the pulse generator at a first point in time,
- receiving a reflection of the second electromagnetic pulse at the pulse generator at a second point in time,
  - wherein the difference between the second point in time and the first point in time comprises a time-lapse;
- collecting a plurality of time-lapses;
- plotting the plurality of time-lapses as a function of time.

14. The method of claim 13, wherein a first electromagnetic pulse is generated at a first port of the pulse generator and a second electromagnetic pulse is generated at a second port of the pulse generator, and wherein a reflection of the first electromagnetic pulse is received at the first port of the pulse generator and a reflection of the second electromagnetic pulse is received at the second port of the pulse generator.

15. The method of claim 13, wherein a first electromagnetic pulse is generated at a first port of the pulse generator, a reflection of the first electromagnetic pulse is received at a third contact and transmitted to a third port of the pulse generator, and wherein a second electromagnetic pulse is generated at a second port of the pulse generator and a reflection of the second electromagnetic pulse is received at a fourth contact and transmitted to a fourth port of the pulse generator.

16. The method of claim 13, further comprising:
- inverting the plurality of time-lapses to obtain a distribution of a casing shape.

17. The method of claim 13, further comprising:
- inverting the plurality of time-lapses to obtain a distribution of electromagnetic properties of a fluid in a wellbore.

18. The method of claim 13, wherein the frequency of the electromagnetic pulse applied is between approximately 1 Hz and approximately 10 GHz.

19. The method of claim 13, wherein the location of the pulse generator is selected from a group consisting of: the casing, the tubing, a ground terminal, a body of a logging tool, and an electrode on the logging tool.

* * * * *